US010929787B2

(12) United States Patent
Rodriguez Diaz et al.

(10) Patent No.: US 10,929,787 B2
(45) Date of Patent: Feb. 23, 2021

(54) PROCESS SCANNING AND TRACKING AGGREGATION

(71) Applicant: Hamilton Sundstrand Corporation, Charlotte, NC (US)

(72) Inventors: Alfredo Rodriguez Diaz, Juana Diaz, PR (US); Pedro E. Rivera Figueroa, Toa Baja, PR (US); Wilfredo Xavier Perez-Jimenez, Hatillo, PR (US); Orlando Rosado Nieves, Coamo, PR (US); Jose A. Gonzalez Velez, San Juan, PR (US); Ahmed David Costas Lopez, Coto Laure, PR (US); Migna Delgado Ocasio, Humacao, PR (US); Radames Tricoche Pedrogo, Coamo, PR (US); Luis R. Soto Guzman, Ponce, PR (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 308 days.

(21) Appl. No.: 15/824,350

(22) Filed: Nov. 28, 2017

(65) Prior Publication Data
US 2019/0164090 A1 May 30, 2019

(51) Int. Cl.
*G06Q 10/06* (2012.01)
*G06Q 10/10* (2012.01)
*G06Q 10/08* (2012.01)

(52) U.S. Cl.
CPC ..... *G06Q 10/0631* (2013.01); *G06Q 10/0633* (2013.01); *G06Q 10/0637* (2013.01);
(Continued)

(58) Field of Classification Search
None
See application file for complete search history.

(56) References Cited

U.S. PATENT DOCUMENTS 5,586,038 A * 12/1996 Nagaoka ............ G05B 19/4183
700/95
8,069,071 B2 11/2011 Kall et al.
(Continued)

FOREIGN PATENT DOCUMENTS

WO 2017006305 1/2017
WO 2017006305 A1 1/2017

*Primary Examiner* — Alan S Miller
*Assistant Examiner* — Arif Ullah
(74) *Attorney, Agent, or Firm* — Cantor Colburn LLP (57) ABSTRACT

An apparatus includes a process scanner and a processor connected with the process scanner. The processor is configured to retrieve, via the processing scanner, operation information indicative of a serial number of an operation, an operation number, an order number of an order associated with the operation, a work time spent on the operation, and a material number of a material associated with the operation. The processor associates the operation information with a first user assigned to the operation, and saves, to a history database, a process record. The record includes the first user, a time element, a location of the operation, a completion status of the operation, a current status of the operation, and one or more turnbacks of the operation. The processor outputs to a display a graphic of the operation information and a balance of user time associated with the operation information.

18 Claims, 5 Drawing Sheets

(52) U.S. Cl.
CPC ......... *G06Q 10/06398* (2013.01); *G06Q 10/063114* (2013.01); *G06Q 10/087* (2013.01); *G06Q 10/109* (2013.01)

(56) References Cited

U.S. PATENT DOCUMENTS

| | | | |
|---|---|---|---|
| 8,121,716 B2 | 2/2012 | Offenmüller | |
| 2003/0167238 A1* | 9/2003 | Zeif | G05B 23/0267 705/400 |
| 2009/0235253 A1* | 9/2009 | Hope | G06Q 10/10 718/100 |

* cited by examiner

PROCESS SCANNING AND TRACKING AGGREGATION

BACKGROUND

Exemplary embodiments pertain to the art of computer-implemented process tracking and scanning, and more specifically, to process scanning and tracking aggregation systems.

Manufacturing operations often include multiple steps. The steps are sometimes broken down to tasks (sub-steps), and the sub-steps may be further broken down to finer categories of activities that each must be accomplished before the manufacture is complete. In some manufacturing arrangements, one individual may be assigned to complete a particular task. Often the assigned task involves multiple sub-steps that may require one or more sets of parts to complete. It is also often the case that subsequent steps cannot be accomplished until previous steps are complete. When one or more of the items needed to complete the task are missing or delayed, the entire task is delayed, which can cost a manufacturer valuable resources while that delay is remedied.

Tracking processes, remedying delays, and managing the efficiency of a manufacturing operation are aided with enterprise research planning tools. Enterprise Resource Planning (ERP) tools assist an organization in the collection, storage, management, and interpretation of data related to manufacturing processes. Conventional systems for process scanning and tracking involve multiple hardware-based and software-based tools including scanners, software utilities, and databases for information storage.

Manufacturing Execution System (MES) organization can collect, store, manage, and interpret data. For example, MES systems often coordinate the knowledge, skills, tools, and systems required to meet the unique requirements for the entire manufacturing process. MES and ERP systems are often used by manufacturers to manage the steps/tasks/sub-steps described above, as well as track metrics and financial information associated with the processes. For example, MES include process flow tools, control parameters for the manufacturing steps, performance measurements, capability measurements, process quality measurements, and product quality measurements, to name a few. Conventional process management systems use both MES systems in conjunction with ERP tools, which must be coordinated by the manufacturing personnel and management personnel. Coordination of ERP tools and the MES systems can be time consuming, and may require many hours of training to become proficient in their use.

BRIEF DESCRIPTION

Disclosed is an apparatus that includes a process scanner and a processor operatively connected with the process scanner. The processor is configured to retrieve, via the processing scanner, operation information indicative of a serial number of an operation, an operation number, an order number of an order associated with the operation, a work time spent on the operation, and a material number of a material associated with the operation. The processor associates the operation information with a first user assigned to the operation, and saves, to a history database, a process record. The record is indicative of the first user, a time element, a location element of a location of the operation, a completion status of the operation, a current status of the operation, and one or more turnbacks of the operation. The processor outputs, via an output display operatively connected with the processor, an output indicative of the operation information and a balance of user time associated with the operation information.

Also disclosed is a method for tracking a process. The method includes retrieving, via a processor in communication with a barcode scanner, operation information. The operation information is indicative of a serial number of an operation, an operation number, an order number of an order associated with the operation, a work time spent on the operation, and a material number of a material associated with the operation. The processor associates the operation information with a first user assigned to the operation, and saves, to a history database, a process record. The record is indicative of the first user, a time element, a location element of a location of the operation, a completion status of the operation, a current status of the operation, and one or more turnbacks of the operation. The processor outputs, via an output display operatively connected with the processor, an output indicative of the operation information and a balance of user time associated with the operation information.

Also disclosed is a computer program product for tracking a process. The computer program product includes a computer readable storage medium having program instructions stored thereupon. The program instructions are executable by a processor to cause the processor to perform a method. The method includes retrieving, via a processor in communication with a barcode scanner, operation information. The operation information is indicative of a serial number of an operation, an operation number, an order number of an order associated with the operation, a work time spent on the operation, and a material number of a material associated with the operation. The processor associates the operation information with a first user assigned to the operation, and saves, to a history database, a process record. The record is indicative of the first user, a time element, a location element of a location of the operation, a completion status of the operation, a current status of the operation, and one or more turnbacks of the operation. The processor outputs, via an output display operatively connected with the processor, an output indicative of the operation information and a balance of user time associated with the operation information.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application. For example, "about" can include a range of ±8% or 5%, or 2% of a given value.

Figure 1:
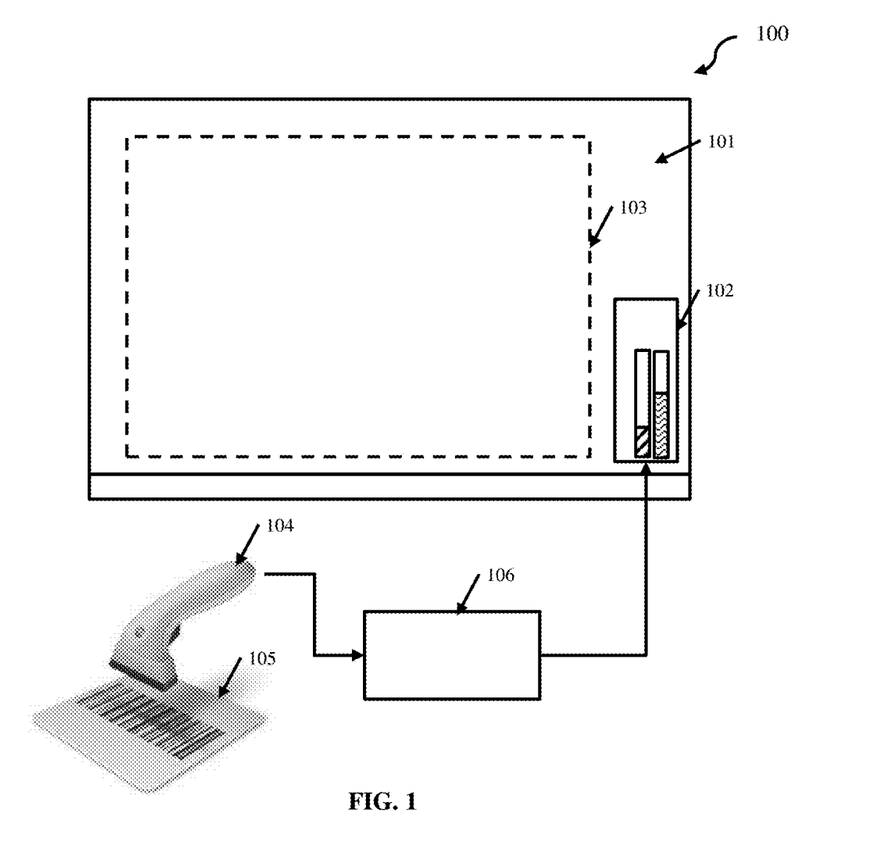
FIG. 1 is an exemplary computing environment according to embodiments.

FIG. 1 depicts a system 100 for tracking a process, according to embodiments. In manufacturing scenarios, among others, personnel often use computer-based tools to accomplish their assigned duties on the manufacturing line. For example, as shown in FIG. 1, it is not uncommon for a user to view their work on a display device such as the display 101. While they perform their work using the display 101, it would be inconvenient and counter-productive to use a work tracking tool that leaves little room on the display 101 for other work. According to one embodiment, a display 101 includes a main work area 103 that is remaining for accomplishing computing tasks, while a user interface 102 displays output to inform the user. In system 100, a processor 106 is shown connected to a processing scanner 104. The processing scanner 104 may be a barcode scanner or other information scanning device such as, for example, an RFID reader or other near-field communication device. As shown in FIG. 1, the processor 106 outputs the user interface 102 oriented to a corner or side of the display 101 to avoid interference with the main view/work area 103. In some aspects, the user interface 102, among other capabilities, outputs visual aids, easy to understand progress trackers, and custom sounds, which may all work together to alert a user when the user is on track or falling behind business requirements with respect to full performance of the task or operation at hand.

The processor 106 is configured to retrieve, via the processing scanner 104, operation information that is associated (and/or includes) a serial number unique to the operation. As used herein, an operation is a step or set of steps in a manufacturing process that are associated with a single article of manufacture. For example, if a manufacturing process is tracking and managing the manufacture of a seat assembly (the article of manufacture), each of the steps or sub-steps in that operation may have a unique serial number for each manufactured seat assembly. The processing scanner 104 scans an input code (e.g., a barcode 105 or other information storage device) indicative of a serial number associated with an operation on that particular article of manufacture. Using the input code, the processor 106 retrieves operation information from an operatively connected database. According to embodiments, the processor 106 outputs the user interface 102 on the display 101. The output communicates facts to the user in connection with their performance of the operation, such as a remaining balance of time left to work on a given task (based on a time budget and a tracked amount of time already expended), a rate of work in progress with respect to total work assigned for the shift, and other facts.

Figure 2:
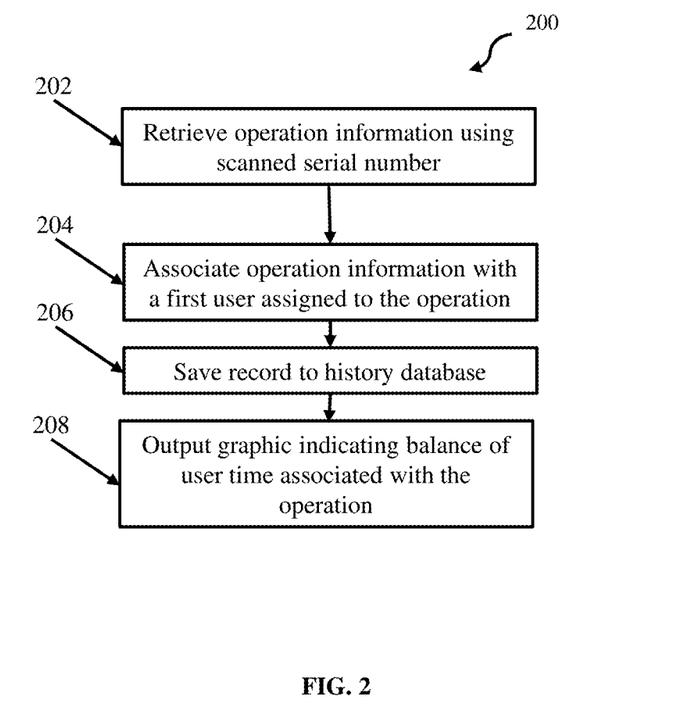
FIG. 2 is a computer-implemented method for tracking a process according to an embodiment.
Figure 5:
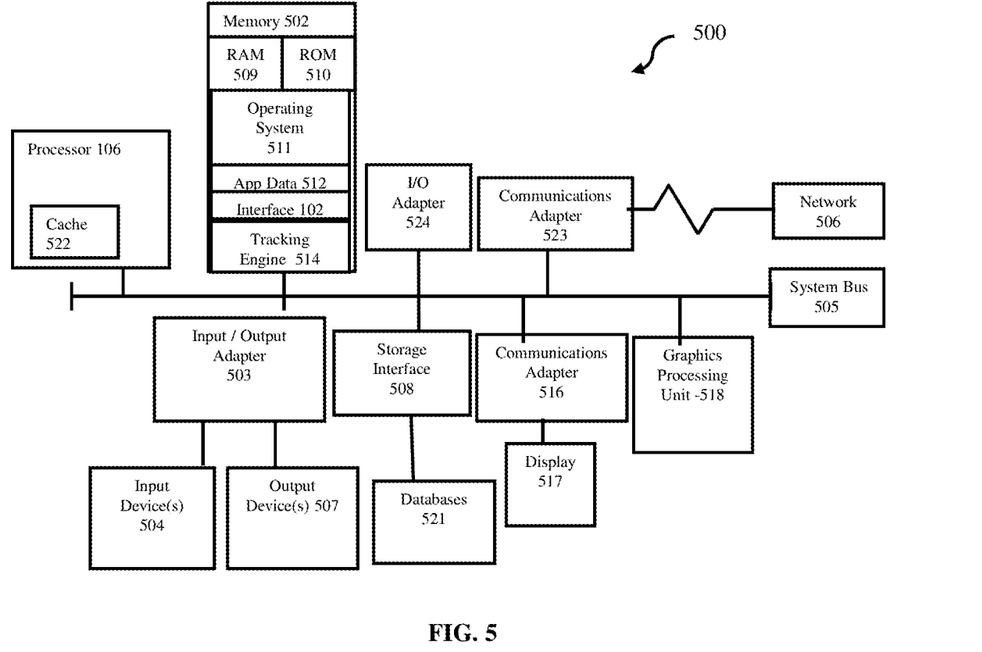
FIG. 5 depicts an exemplary computing environment and computing system for practicing one or more embodiments.

FIG. 2 depicts a computer-implemented method 200 for tracking a process, according to an embodiment. FIG. 5 depicts an exemplary computing environment and computing system for practicing one or more embodiments. FIGS. 1, 2, and 5 will be discussed in conjunction with one another.

Referring now to FIG. 2, the processor 106 retrieves operation information using the scanned serial number retrieved by scanning the barcode 105. The serial number is associated a particular manufacturing process, and follows the process throughout the manufacture of the article. For example, if an article of manufacture includes a process of assembling a seat assembly, the entire process of assembling the seat assembly is associated with a unique serial number. The seat assembly serial number is associated with sub-processes (for example, cutting a cushion to shape, preparing electrical connections, etc.) that each have their own unique serial numbers. When a process or sub-process (hereafter called an operation) is worked on by a user, the user scans a barcode 105 associated with that operation. The processor 106 retrieves operation information from an operatively connected computer-readable memory such as a database stored on a connected server. FIG. 5, showing exemplary computing system 500, depicts a storage interface 508 connected with the processor 106, that retrieves the operation information from one or more databases 521. An exemplary database, such as the one described hereafter with respect to FIG. 4, stores, updates, and organizes the operation information associated with the serial numbers.

As shown in block 204, the processor 106 associates the operation information with a first user assigned to the operation. A first user may be, for example, a user on a first shift that is tasked with assembling the seat assembly. At block 206, the processor 106 saves the record to the history database (described in greater detail below). The record includes information associated with the operation of a particular article of manufacture, including an identification of the first user assigned to the operation, a time element (e.g., minutes spent working on the operation), a location element (e.g., a particular factory, manufacturing line, etc.) associated with the operation, a completion status of the operation, a current status of the operation, and one or more turnbacks of the operation, which are described in greater detail below.

Figure 4:
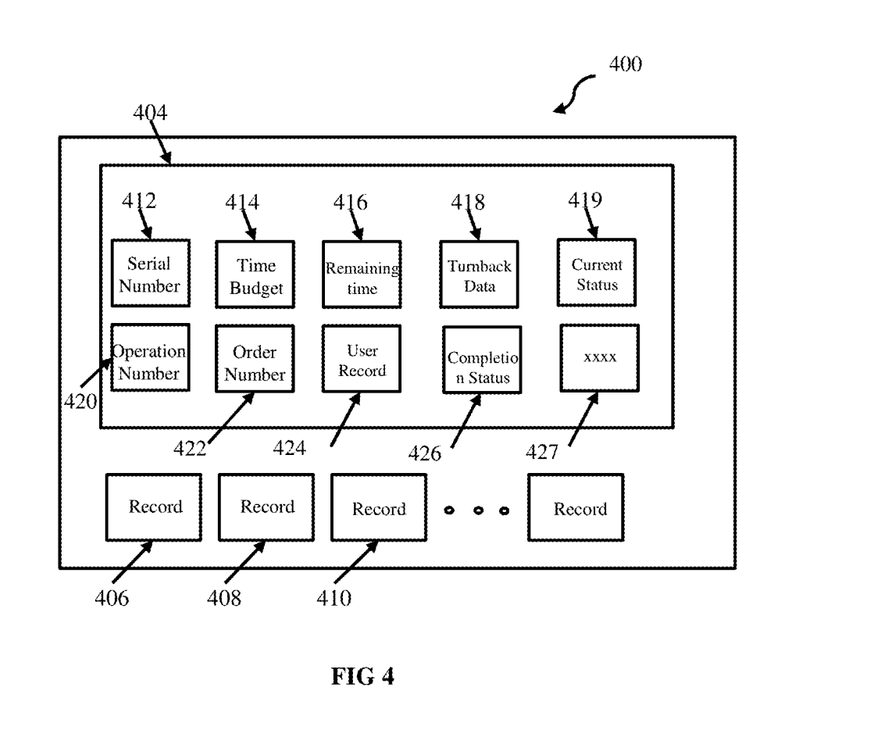
FIG. 4 depicts a history database according to embodiments.

Turning briefly to FIG. 4, a history database 400 is depicted, according to embodiments. The history database 400 includes multiple records such as, for example, the records 404, 406, 408, and 410. Although only 5 records are depicted in FIG. 4, it is appreciated that the history database 400 can contain any number of records that are associated with operations of a manufacturing or other process.

The record 404 includes data associated with a particular operation such as a unique serial number 412, an operation number 420, a time budget 414, an order number 422, a remaining time 416, a user record 424, turnback data 418, and a status 426 of the operation. Other information 418 and 426 are contemplated, which represents other aspects informing a status or progress of an operation.

According to some aspects, the system 100 is configured for registering and segregating users by location such as plant site, building, area, process, shift, role, or other business required partition. User record 424 may include any one or more of these exemplary categories of information.

Figure 3:
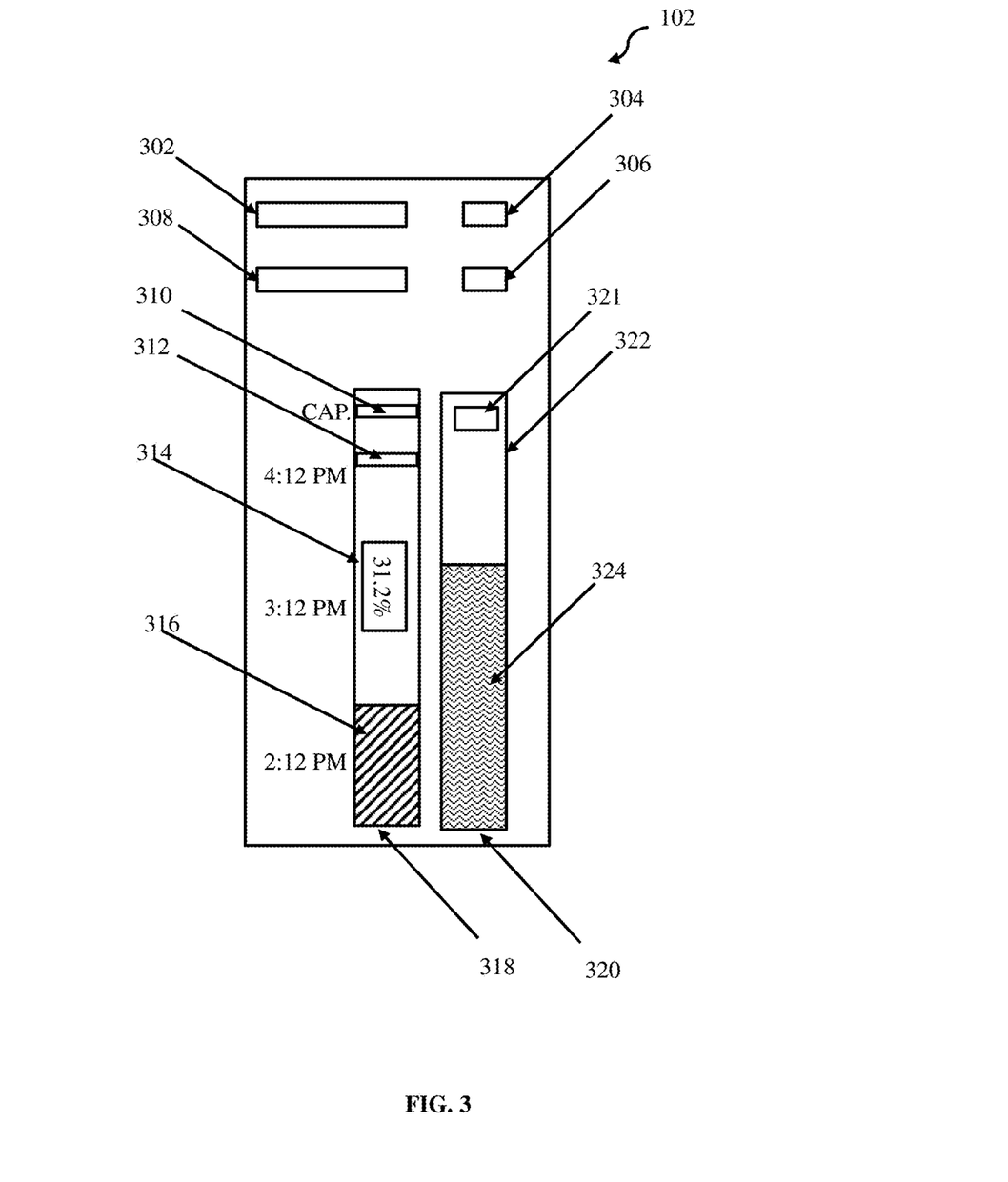
FIG. 3 depicts a user interface according to embodiments.

At block 208, the processor outputs a graphic user interface 102 indicating a balance of user time associated with the operation. The user interface 102 uses visual aids to inform a user of their tracked progress in completion of a task, and compares their actual performance to a business metric (e.g., time budget 414 with respect to the remaining time 416, etc.) that is associated with the serial number 412 and the user record 424 in the history database 400.

FIG. 3 depicts the user interface 102 according to an embodiment. FIGS. 3 and 4 will be considered simultaneously. The user interface 102 includes a daily work status bar 318, and a work in progress status bar 320. The user interface 102 includes biographical information that uniquely identifies the user and provides time and general information. Looking at the upper-most portion of the user interface 102 in FIG. 3, a host of biographical and time information includes a user identification 302, a user status indicator 304, a current time 306, and a work shift elapsed time 308. For example, the user identification identifies a particular user that is performing the operation (a user name, ID number, etc.). Accordingly, when the processor 106 associates the operation information in the record (e.g., record 404) to a unique user (e.g., user record 424), during the output step the processor outputs the associated user identification 302. The processor 106 may receive user and record assignments as a batch input (multiple assignments of tasks to users at one time) or as an individual input by querying the user (i.e., outputting a request for user identification). In some aspects, the processor 106 receives the user input and saving the user input to the history database 400 as a unique user record 424.

The processor 106 associates the current time 306 with a bracket of work time spent by the user, which the processor 106 subtracts from the time budget 414 record, and records the remaining time 416 left for that particular serial number 412.

When the processor 106 associates the operation information with the first user assigned to the operation, the processor 106 may retrieve the completion status 426 in the history database 400. The completion status 426 corresponds the daily work status bar 316 in the user interface 102 as shown in FIG. 3. The completed work bar 316 represents work completed 316 by the user as a corresponding portion of the daily work status bar 318. The daily work status bar 318 is indicative of the work assigned and completed by the user for an entire shift. The shift is demarcated by time to the left of the daily work status bar.

The capacity bar 310 depicts the total capacity for user. User capacity is stored in the history database 400 as part of the user record 424. The total capacity 310 for the user is the amount of theoretical capacity the processor 106 calculates as possible work output for a particular user. The capacity 310 changes over time, and is continually updated by the processor 106.

The assigned work bar 312 represents a workload that has been assigned to an individual user. For example, a user scans their work during the progress of the day. The assigned work bar 312 increases (approaches the capacity line 310) by 1 increment (for example, one hour) after each scan of a particular operation for each individual unit. Each operation has a specific standard time to complete the operation. Ideally a manager would endeavor to assign work such that the assigned work bar 312 is close or on top of the total capacity 310 for the user, which would indicate that the user is assigned full capacity during the shift. For example, a manager would not want to overload an operator (user) with excess work that is not workable during an 8 hour shift. If a worker is over capacity, this will be indicated, which will alert the need for overtime or carry-over to next shift. If shift is 8 hours, blue line indicates 7.5 hours (less a time for a break) for total capacity. Notably, each worker may operate at different efficiencies, and thus, the capacity line 310 changes for each worker according to a history stored in the user record 424. Stated in another way, the entire daily work status bar 318 shows that a user has work that is doable within that worker's unique abilities.

The work in progress status bar 320 on the right side of the user interface 102 works as a real-time visual indication that the user is doing the assigned work at an optimal pace to satisfy the metrics shown in the work status bar 318. For example, for a given scanned task, the processor may retrieve the time budget 414 for that task, determine a work in progress completion goal 321, and output the completion goal (a time) 321 on the user interface 102. The work in process elapsed time 324 represents the amount of work for a task completed with respect to a time budget associated with that task. A user knows when they are working at a satisfactory pace by an indicator associated with the work in progress bar 320. One example may be a green color indicator that the processor 106 outputs for the process elapsed time bar 324 when the worker is progressing through the task at a satisfactory rate to satisfy all of the assigned work bar 312 by the end of the current shift.

The processor 106 outputs the current status 419 on the user interface 106 as a ratio of completed work in process (shown as an empty portion of the bar 322) with respect to the completed portion of the entire task. The processor 106 evaluates a completion work percentage 314 indicative of a percentage of work for which the user has capacity to perform in a given time period. The cap of the given time period is shown as a time cap 310. As the user scans a barcode indicating that a sub-step (for example, step 3 of 5 needed steps for a task, or 60% of the task), the processor 106 evaluates the completion work percentage value based on the completion status, the current status and the turnbacks. The processor may query for information from the user, and receive the data in the form of user input. For example, the processor 106 may output a message requesting input for a completed work ratio, receive the response, and save the response to the history database 400. The completed work ratio is a completed percentage of a particular operation assigned to the first user. The processor indicates the completed work ratio a percentage of completed work 314.

A turnback is something that is delaying your work (e.g., missing a kit to complete work). Turnback alerts are a user selectable status indicator that indicates that a problem has occurred that prevents the completion of an assigned task. A turnback indicator is saved as turnback data 418. When a turnback is triggered by a user by selecting a turnback button on the user interface 102, the processor 106 generates an alert (an email, a text message, an audible message, etc.) to a responsible person. The alert is indicative of the turnback (the problem) stopping progress of the work. A stop work in process (turnback) button is selectable when there is some reason that work must be stopped for whatever reason (missing parts). According to embodiments, the processor 106 is configured to track the overall user productivity of the first user based on a combination of the productivity during a particular work shift (e.g., 8 hours of continuous work less a time period for a break), the user's efficiency, the one or more turnbacks indicative of an operational impedance associated with the operation, and a problem resolution of that operational impedance. For example, tracking the overall user productivity may include querying a manager or responsible party for information, using the processor 106, where the information is indicative of the resolution to whatever has impeded the operation. The information may further include a time value associated with that resolution which the processor 106 can credit to the user's time allocation (capacity 310) by subtracting from that total capacity due to time delays that stopped their work.

In another aspect, the processor 106 processor is further configured to track the productivity of the first user based on a combination of the work completed, the efficiency, the one or more turnbacks, and a problem resolution of an operational impedance of the operation. Although a first user and a second user are described herein, it is appreciated that embodiments of the present invention are configured to track the productivity of any number of users simultaneously. Moreover, it is contemplated that any serial number associated with an operation may be associated with a plurality of unique users such that the operation is tracked with respect to the accumulated time of all of the associated users.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

FIG. 5 illustrates a block diagram of an exemplary computing environment and computer system 500 for use in practicing the embodiments described herein. The environment and system described herein can be implemented in hardware, software (e.g., firmware), or a combination thereof. In an exemplary embodiment, a hardware implementation can include a microprocessor of a special or general-purpose digital computer, such as a personal computer, workstation, minicomputer, or mainframe computer. Computer 500 therefore can embody a general-purpose computer. In another exemplary embodiment, the implementation can be part of a mobile device, such as, for example, a mobile phone, a personal data assistant (PDA), a tablet computer, etc.

As shown in FIG. 5, the computer 500 includes processor 106. Computer 500 also includes memory 502 communicatively coupled to processor 106, and one or more input/output adapters 503 that can be communicatively coupled via system bus 505. Memory 502 can be communicatively coupled to one or more internal or external memory devices via a storage interface 508. Communications adapter 523 can communicatively connect computer 500 to one or more networks 506. System bus 505 can communicatively connect one or more user interfaces via input/output (I/O) adapter 503. I/O adapter 503 can connect a plurality of input devices 504 to computer 500. Input devices can include, for example, a keyboard, a mouse, a microphone, a sensor, etc. System bus 505 can also communicatively connect one or more output devices 507 via I/O adapter 503. Output device 507 can include, for example, a display, a speaker, a touchscreen, etc.

Processor 106 is a hardware device for executing program instructions (aka software), stored in a computer-readable memory (e.g., memory 502). Processor 106 can be any custom made or commercially available processor, a central processing unit (CPU), a plurality of CPUs, an auxiliary processor among several other processors associated with the computer 500, a semiconductor based microprocessor (in the form of a microchip or chip set), or generally any device for executing instructions. Processor 106 can include a cache memory 522, which can include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory 522 can be organized as a hierarchy of more cache levels (L1, L2, etc.).

Processor 106 can be disposed in communication with one or more memory devices (e.g., RAM 509, ROM 510, one or more external databases 521, etc.) via a storage interface 508. Storage interface 508 can also connect to one or more memory devices including, without limitation, one or more databases 521, and/or one or more other memory drives (not shown) including, for example, a removable disc drive, etc., employing connection protocols such as serial advanced technology attachment (SATA), integrated drive electronics (IDE), IEEE-1394, universal serial bus (USB), fiber channel, small computer systems interface (SCSI), etc. The memory drives can be, for example, a drum, a magnetic disc drive, a magneto-optical drive, an optical drive, a redundant array of independent discs (RAID), a solid-state memory device, a solid-state drive, etc. Variations of memory devices can be used for implementing, for example, list all databases from other figures.

Memory 502 can include random access memory (RAM) 509 and read only memory (ROM) 510. RAM 509 can be any one or combination of volatile memory elements (e.g., DRAM, SRAM, SDRAM, etc.). ROM 510 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 502 can incorporate electronic, magnetic, optical, and/or other types of non-transitory computer-readable storage media. Memory 502 can also be a distributed architecture, where various components are situated remote from one another, but can be accessed by processor 106.

The instructions in memory 502 can include one or more separate programs, each of which can include an ordered listing of computer-executable instructions for implementing logical functions. In the example of FIG. 5, the instructions in memory 502 can include an operating system 511. Operating system 511 can control the execution of other computer programs and provides scheduling, input-output control, file and data management, memory management, and communication control and related services.

The program instructions stored in memory 502 can further include application data 512, and for a user interface 102.

Memory 502 can include program instructions for a tracking and aggregation engine 514, which can be configured to perform embodiments described herein.

I/O adapter 503 can be, for example but not limited to, one or more buses or other wired or wireless connections. I/O adapter 503 can have additional elements (which are omitted for simplicity) such as controllers, microprocessors, buffers (caches), drivers, repeaters, and receivers, which can work in concert to enable communications. Further, I/O adapter 503 can facilitate address, control, and/or data connections to enable appropriate communications among the aforementioned components.

I/O adapter 503 can further include a display adapter coupled to one or more displays. I/O adapter 503 can be configured to operatively connect one or more input/output (I/O) devices 507 to computer 500. For example, I/O 503 can connect a keyboard and mouse, a touchscreen, a speaker, a haptic output device, or other output device. Output devices 507 can include but are not limited to a printer, a scanner, and/or the like. Other output devices can also be included, although not shown. Finally, the I/O devices connectable to I/O adapter 503 can further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to some embodiments, computer 500 can include a mobile communications adapter 523. Mobile communications adapter 523 can include GPS, cellular, mobile, and/or other communications protocols for wireless communication.

In some embodiments, computer 500 can further include communications adapter 523 for coupling to a network 506.

Network 506 can be an IP-based network for communication between computer 500 and any external device. Network 506 transmits and receives data between computer 500 and devices and/or systems external to computer 500. In an exemplary embodiment, network 506 can be a managed IP network administered by a service provider. Network 506 can be a network internal to an aircraft, such as, for example, an avionics network, etc. Network 506 can be implemented in a wireless fashion, e.g., using wireless protocols and technologies, such as WiFi, WiMax, etc. Network 506 can also be a wired network, e.g., an Ethernet network, an ARINC 429 network, a controller area network (CAN), etc., having any wired connectivity including, e.g., an RS232 connection, R5422 connection, etc. Network 506 can also be a packet-switched network such as a local area network, wide area network, metropolitan area network, Internet network, or other similar type of network environment. The network 506 can be a fixed wireless network, a wireless local area network (LAN), a wireless wide area network (WAN) a personal area network (PAN), a virtual private network (VPN), intranet or other suitable network system.

Network 506 can operatively connect computer 500 to one or more devices including device 517, and device 518. Network 506 can also connect computer 500 to one or more servers.

If computer 500 is a PC, workstation, laptop, tablet computer and/or the like, the instructions in the memory 502 can further include a basic input output system (BIOS) (omitted for simplicity). The BIOS is a set of routines that initialize and test hardware at startup, start operating system 511, and support the transfer of data among the operatively connected hardware devices. The BIOS is typically stored in ROM 510 so that the BIOS can be executed when computer 500 is activated. When computer 500 is in operation, processor 106 can be configured to execute instructions stored within the memory 502, to communicate data to and from the memory 502, and to generally control operations of the computer 500 pursuant to the instructions.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C #, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An apparatus comprising:
a process scanner;
a processor operatively connected with the process scanner and configured to:
retrieve, by operating the processing scanner to scan an input code comprising a bar code, operation information associated with a serial number of an operation, an operation number, an order number of an order associated with the operation, a work time spent on the operation, and a material number of a material associated with the operation;
associate the operation information with a first user assigned to the operation;
save, to a history database, a record indicative of the first user, a time element, a location element of a location of the operation, a completion status of the operation, a current status of the operation, and one or more turnbacks of the operation;
retrieve the completion status, the current status, and the one or more turnbacks from the operation information;
evaluate a completion work percentage indicative of a percentage of work capacity based on the completion status, the current status, and the one or more turnbacks;
query and receive a user input for a completed work ratio indicative of a completion percentage of the operation assigned to the first user;
evaluate a remaining budget associated with the serial number based on the user input;
evaluate an efficiency of the operation based on operation information and the completed work ratio;
determine a capacity overage for the first user based at least in part on the remaining budget associated with the serial number and the efficiency, wherein the capacity overage comprises an indication of overtime or carry-over associated with the first user; and
output a main work area and a user interface onto a display screen coupled to the process scanner, the user interface having:
a daily work status bar indicative of the work assigned and completed by the first user for an entire shift including the operation,
a work in progress status bar indicative of a productivity of the first user based on a combination of a productivity value and an efficiency value indicative of a first user efficiency, wherein the first user efficiency associates the first user's completion of the operation with respect to an available budget of time associated with the operation, and
an assigned work bar indicative of the capacity overage of the first user, wherein the assigned work bar comprises an alert to the first user of the capacity overage.

2. The apparatus of claim 1, wherein the processor is further configured to track the productivity of the first user based on a combination of the efficiency, and one or more turnbacks of the operation.

3. The apparatus of claim 2, wherein the processor is further configured to track the productivity of the first user based on a combination of the productivity, the efficiency, the one or more turnbacks, and a problem resolution of an operational impedance of the operation.

4. The apparatus of claim 3, wherein the process scanner is a barcode scanner configured to:

scan a barcode on an article of manufacture indicative of the serial number associated with the operation; and
the processor is configured to:
receive the serial number from the barcode scanner; and
retrieve the operation information using the serial number and material number.

5. The apparatus of claim 4, wherein the processor is further configured to:
associate the serial number to the operation information;
evaluate a remaining budget for the operation; and
update the history database with the remaining available budget of time associated with the operation.

6. The apparatus of claim 5, wherein the processor is configured to associate a second user with the operation information;
evaluate the remaining budget based on a completion of the operation, a time value of work associated with the first user's work on the operation and further based on a time value of work associated with the second user's work on the operation; and
update the history database the available budget of time associated with the operation indicative of a sum of the work time spent on the operation for the first user, and a work time spent on the operation for the second user.

7. A method tracking a process comprising:
retrieving, by a processor operating a processing scanner to scan an input code comprising a bar code, operation information indicative of a serial number of an operation, an operation number, an order number of an order associated with the operation, a work time spent on the operation, and a material number of a material associated with the operation;
associating the operation information with a first user assigned to the operation; and
outputting a main work area and a user interface onto a display screen coupled to the process scanner, the user interface having:
a daily work status bar indicative of work completed by the first user for an entire shift including the operation, and
a work in progress status bar indicative of a productivity of the first user based on a combination of a productivity value and an efficiency value indicative of a first user efficiency, wherein the first user efficiency associates the first user's completion of the operation with an available budget of time associated with the operation, and
an assigned work bar indicative of a capacity overage of the first user, wherein the assigned work bar comprises an alert to the first user of the capacity overage.

8. The method of claim 7, further comprising:
querying and receiving a user input for a completed work ratio indicative of a completion percentage of the operation assigned to the first user; and
tracking the productivity of the first user based on a combination of an efficiency of the operation based on operation information and the completed work ratio, and one or more turnbacks of the operation.

9. The method of claim 8, further comprising:
tracking the productivity of the first user based on a combination of the productivity, an efficiency, the one or more turnbacks, and a problem resolution of an operational impedance of the operation.

10. The method of claim 9, further comprising:
scanning a barcode on an article of manufacture indicative of the serial number associated with the operation; and
receiving the serial number from the scanner; and
retrieving the operation information using the serial number and material number.

11. The method of claim 10, further comprising:
associating the serial number to the operation information;
evaluating a remaining budget for the operation; and
updating the history database with the remaining available budget of time associated with the operation.

12. The method of claim 11, further comprising:
evaluating the remaining budget based on a completion of the operation, a time value of work associated with the first user's work on the operation and further based on the time value of work associated with a second user's work on the operation; and
updating the history database the available budget of time associated with the operation indicative of a sum of the work time spent on the operation for the first user, and a work time spent on the operation for the second user.

13. A computer program product for tracking a process, the computer program product comprising a computer readable storage medium having program instructions embodied therewith, the program instructions executable by a processor to cause the processor to perform a method comprising:
retrieving, via a processor operating a barcode scanner to scan an input code comprising a bar code, operation information indicative of a serial number of an operation, an operation number, an order number of an order associated with the operation, a work time spent on the operation, and a material number of a material associated with the operation;
associating, via the processor, the operation information with a first user assigned to the operation;
saving, via a processor, a record to a history database, the record indicative of the first user, a time element, a of a location of the operation, a completion status of the operation, a current status of the operation, and one or more turnbacks of the operation;
retrieving the completion status, the current status, and the one or more turnbacks from the operation information;
evaluating a completion work percentage indicative of a percentage of work capacity based on the completion status, the current status, and the one or more turnbacks;
querying and receive a user input for a completed work ratio indicative of a completion percentage of the operation assigned to the first user;
evaluating a remaining budget associated with the serial number based on the user input;
evaluating an efficiency of the operation based on operation information and the completed work ratio;
determining a capacity overage for the first user based at least in part on the remaining budget associated with the serial number and the efficiency, wherein the capacity overage comprises an indication of overtime or carry-over associated with the first user; and
outputting a main work area and a user interface onto a display screen coupled to the barcode scanner, the user interface having:
a daily work status bar indicative of the work assigned and completed by the first user for an entire shift including the operation,
a work in progress status bar indicative of a productivity of the first user based on a combination of a productivity value and an efficiency value indicative of a first user efficiency, wherein the first user efficiency associates the first user's completion of the operation with respect to an available budget of time associated with the operation, and an assigned work bar indicative of the capacity overage of the first user, wherein the assigned work bar comprises an alert to the first user of the capacity overage.

14. The computer program product of claim 13, wherein the processor is further configured to track the productivity of the first user based on a combination of the efficiency, and one or more turnbacks of the operation.

15. The computer program product of claim 14, wherein the process scanner is a barcode scanner configured to:

scan a barcode on an article of manufacture indicative of the serial number associated with the operation; and the processor is configured to:

receive the serial number from the barcode scanner; and retrieve the operation information using the serial number and material number.

16. The computer program product of claim 15, wherein the processor is further configured to:

associate the serial number to the operation information;

evaluate a remaining budget for the operation; and update the history database with the remaining available budget of time associated with the operation.

17. The computer program product of claim 16, wherein the processor is configured to associate a second user with the operation information;

evaluate the remaining budget based on a completion of the operation, a time value of work associated with the first user's work on the operation and further based on a time value of work associated with the second user's work on the operation; and update the history database the available budget of time associated with the operation indicative of a sum of the work time spent on the operation for the first user, and a work time spent on the operation for the second user.

18. The computer program product of claim 14, wherein the processor is further configured to track the productivity of the first user based on a combination of the productivity, the efficiency, the one or more turnbacks, and a problem resolution of an operational impedance of the operation.

* * * * *